May 24, 1932.  A. C. DURDIN, JR  1,859,436
SEAL FOR SHAFTS
Filed Oct. 13, 1928
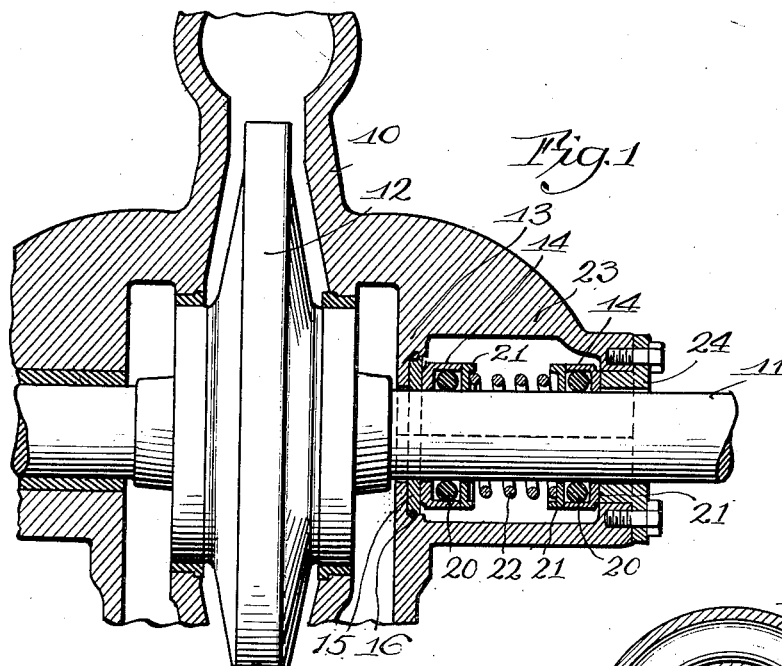
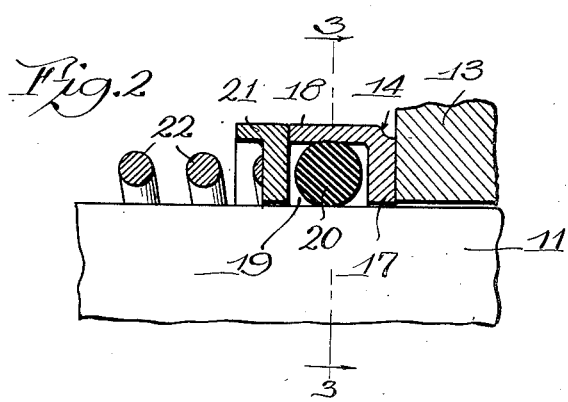
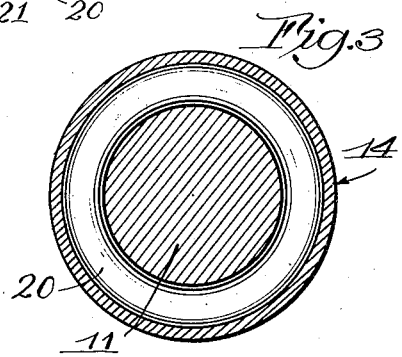
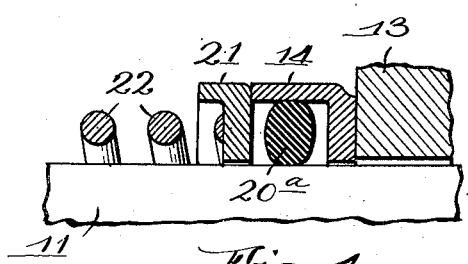
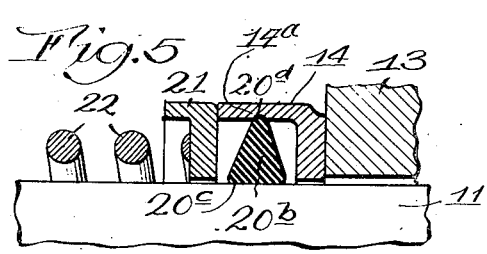
Inventor,
Augustus C. Durdin Jr.
by Charles O. Shervey
his Atty Patented May 24, 1932

1,859,436

UNITED STATES PATENT OFFICE

AUGUSTUS C. DURDIN, JR., OF CHICAGO, ILLINOIS, ASSIGNOR TO CHICAGO PUMP COMPANY, OF CHICAGO, ILLINOIS, A CORPORATION OF ILLINOIS

SEAL FOR SHAFTS

Application filed October 13, 1928. Serial No. 312,296.

This invention relates to seals for shafts, and its principal object is to provide improved means for preventing leakage of liquid (or gas) from a pump or compressor casing, at the place where the shaft passes through a wall thereof. Seals of the character forming the subject matter of this specification usually comprise a flanged metal ring held in close contact with the wall of the case, and a rubber ring held under compression between the flanged ring and shaft, but due to reciprocation or oscillation of the shaft through the rubber ring, the latter is subject to wear with the result that leaks are likely to occur.

One object of the present invention is to provide a resilient seal ring fitting tightly between the shaft and a surrounding flange, which ring shall be free to roll or rock upon the shaft or flange in case of oscillation or reciprocation thereof, whereby the abrasive action of the shaft on the ring is entirely eliminated. Another object is to provide a double seal whereby leakage is prevented at both sides of a chamber.

With these and other objects and advantages in view, this invention consists in a seal for shafts in which the resilient seal ring is capable of rolling or rocking on the shaft or the surrounding member in which the seal ring is confined. It further consists in a double seal in which a single spring is employed for holding two seals in operative condition. It further consists in the several novel features hereinafter fully set forth and claimed.

The invention is clearly illustrated in the accompanying drawings in which—

Figure 1 is a central vertical section through a fragment of a pump showing a simple embodiment of the invention applied thereto;

Fig. 2 is an enlarged detail longitudinal section of the sealing members;

Fig. 3 is a detail vertical cross section taken on the line 3—3 of Fig. 2;

Fig. 4 is a detail section showing a modified form of the invention; and

Fig. 5 is a detail section showing a second modification.

Referring to said drawings, and first to Figs. 1, 2 and 3, the reference character 10 designates the casing of a water pump, compressor or the like, through which extends a shaft 11, journaled in suitable bearings and having an impeller 12, or other mechanism thereon, which is rotated by the shaft. A suitable motor (not shown), or other power element, is provided for rotating the shaft.

The shaft extends out through a wall 13 of the case and the clearance space between the shaft, and the aperture in the wall, through which the shaft extends, must be protected against leakage, otherwise liquids or gas will leak out at this place. If the case 10 is used as a liquid pump case, the liquid is apt to leak out around the shaft, and if the case is used as a compressor case, the air or gas will leak out around the shaft unless an effective leak proof joint is provided around the shaft at the place where it passes out through the wall of the case.

In accordance with the present invention, I provide a flanged retaining ring 14, preferably formed of hardened steel, which ring fits loosely on the shaft and bears against one face of the case wall or against one face of a washer 15 interposed between the wall and ring. Where the case is formed of bolted together sections, split lengthwise of the shaft, as shown by the dotted lines in Fig. 1, a washer 15 is placed against the wall to cover the joint between the two case sections and a leak proof joint is provided between the washer and case wall as, for instance, by a rubber or other gasket 16. The washer may be considered as part of the case wall. The contacting faces of the flanged ring and case wall, or washer, are ground true to make a very close running fit, so that the possibility of leakage between the contacting faces is prevented so long as the two are held in contact.

The side wall or web 17 and flange 18 of the flanged ring, together with the shaft, form an annular channel 19 in which is contained a resilient seal ring 20 formed of rubber, or other resilient composition, which in its preferred form is round in cross section throughout its extent. The internal diameter of the seal ring is slightly less than that of the diameter of the shaft upon which it is used, and its external diameter is slightly greater than the internal diameter of the flange surrounding the seal ring, whereby when contained in the channel 19, the seal ring is held under compression between the shaft and flange, whereas its lateral sides are not held under pressure. The seal ring, therefore, provides leak proof joint with the shaft 11 and flange of the flanged ring 14.

Bearing against the edge of the flange 18, is a shoulder or metal washer 21 which fits loosely on the shaft and is spring pressed against the flanged ring by a coiled compression spring 22 surrounding the shaft 11. One end of the spring bears against the washer 21 and the other against some abutment or shoulder.

In the drawings a double seal is illustrated for the shaft, and in such cases a housing 23 is provided around the seals. Where the case 10 is split as shown, a ring 24 is provided around the shaft at the free end of the housing and is bolted or otherwise secured to the housing. The ring 24 may be considered as part of the case wall. One of the flanged rings 14 bears against an end face of the ring 24, and said ring 24 is also ground to provide a tight running fit with the flanged ring 14.

When the double seal ring is employed, the coiled compression spring 22 bears against the two washers 21 and holds them against the flanged rings 14, thereby holding the flanged rings in close contact with the contiguous faces of the case walls or rings 15, and 24, if the latter are used. When the case is not split lengthwise of the shaft, the rings 15 and 24 may be omitted, as will be understood, and the flanged rings 14 in such cases bear directly against the flat ground faces of the case wall. If desired, the cavity in the housing may serve to contain oil or other lubricant. It will be observed that leakage past the seal is practically impossible.

The ground contacting faces of the flanged ring and casing being held in close contact by the spring, leakage between said faces is prevented, and since the faces of the resilient seal ring bear tightly against the shaft 11 and flange 18 of the flanged ring, leakage is prevented between those parts. Inasmuch as the lateral sides of the seal ring are not confined, it is free to roll or rock on the shaft. Consequently, during any reciprocating or oscillating movements of the shaft, the part of the seal ring contacting therewith moves with the shaft, and any tendency for wear, which would otherwise be occasioned by the shaft moving relative to the contacting face of the resilient ring, is entirely eliminated.

In the modified form of the invention illustrated in Fig. 4, the resilient ring $20^a$ is shown as of oval or elliptical form in cross section, otherwise the construction is substantially the same as that shown in Fig. 1.

In the modified form illustrated in Fig. 5, the resilient ring $20^b$ is shown as of truncated triangular formation, the base $20^c$ of the triangle contacting with the shaft and its apex portion $20^d$ contacting with the flange of the flanged ring 14 which may be grooved as at $14^a$ to receive the apex or peripheral portion of the ring.

I claim as new, and desire to secure by Letters Patent:

1. In a device of the class described, the combination with a rotatable shaft and a wall through which the shaft extends, of a ring surrounding the shaft and bearing against said wall, said ring having a peripheral flange spaced from the shaft, a spring for pressing said ring against said wall, and a resilient seal ring held under pressure solely by said flange and shaft and frictionally connecting said first mentioned ring with the shaft to rotate therewith.

2. In a device of the class described, the combination with a rotatable shaft and a wall through which the shaft extends, of a ring surrounding the shaft and bearing against said wall, said ring having a peripheral flange spaced from the shaft, a spring for pressing said ring against said wall, and a rubber seal ring held under pressure solely by said flange and shaft and frictionally connecting said first mentioned ring with the shaft to rotate therewith.

3. In a device of the class described, the combination with a rotatable shaft and a wall through which the shaft extends, of a ring surrounding the shaft and bearing against said wall, said ring having a peripheral flange spaced from the shaft, a spring for pressing said ring against said wall, and a resilient seal ring held under pressure solely by said flange and shaft and frictionally connecting said first mentioned ring with the shaft to rotate therewith, the body of said ring being round in cross section.

4. In a device of the class described, the combination with a rotatable shaft and a wall through which the shaft extends, of a flanged ring surrounding the shaft and bearing against said wall, the flange of said ring surrounding the shaft and being spaced therefrom, an annular member surrounding the shaft and bearing against the flange of said ring, and forming together with said shaft and flanged ring an annular channel around the shaft, a resilient seal ring contained in said channel and confined under pressure solely between the shaft and flange and frictionally connecting said flanged ring with the shaft to rotate therewith, and a coiled compression spring surrounding the shaft and bearing against said annular member, said spring acting to hold the flanged ring in close contact with the wall.

5. In a device of the class described, the combination with a rotatable shaft and a wall through which the shaft extends, of a flanged ring surrounding the shaft and bearing against said wall, the flange of said ring surrounding the shaft and being spaced therefrom, an annular member surrounding the shaft and bearing against the flange of said ring, and forming together with said shaft and flanged ring an annular channel around the shaft, a resilient seal ring contained in said channel and confined under pressure between the shaft and flange and frictionally connecting said flanged ring with the shaft to rotate therewith, the lateral sides of said ring being free, and a coiled compression spring surrounding the shaft and bearing against said annular member, said spring acting to hold the flanged ring in close contact with the wall.

6. In a device of the class described, the combination with a rotatable shaft and a wall through which the shaft extends, of a flanged member surrounding the shaft and having a flat part bearing against said wall, the flange of said member surrounding the shaft and being spaced therefrom, an annular member surrounding the shaft and bearing against the edge of the flange of said flanged member, a resilient seal ring located between said flanged member and annular member and held under compression solely between the flange and shaft, said seal ring frictionally connecting said flanged member with the shaft, to rotate therewith and the part in engagement with the shaft being free to yield laterally with relation to that part in engagement with the flange, and a coiled compression spring bearing against the annular member and acting to hold the flanged member in close contact with said wall.

AUGUSTUS C. DURDIN, Jr.